United States Patent [19]

Massie, II et al.

[11] Patent Number: 5,356,997
[45] Date of Patent: Oct. 18, 1994

[54] TIRE TREAD COMPOUND MADE WITH STRAIN CRYSTALLIZABLE 3,4-POLYISOPRENE

[75] Inventors: Johnny D. Massie, II, Hudson; Wen-Liang Hsu, Copley; Adel F. Halasa, Bath; Paul H. Sandstrom, Tallmadge, all of Ohio

[73] Assignee: The Goodyear Tire & Rubber Company, Akron, Ohio

[21] Appl. No.: 968,916

[22] Filed: Oct. 30, 1992

Related U.S. Application Data

[60] Continuation-in-part of Ser. No. 930,629, Aug. 17, 1992, Pat. No. 5,239,023, which is a continuation-in-part of Ser. No. 716,475, Jun. 17, 1991, Pat. No. 5,151,398, which is a division of Ser. No. 602,546, Oct. 24, 1990, Pat. No. 5,082,906.

[51] Int. Cl.$^5$ .................. C08F 36/08; C08L 9/00
[52] U.S. Cl. ...................... 525/237; 525/232; 526/93; 526/141; 526/337; 526/340.2; 524/432; 524/571; 524/575.5; 152/209 R
[58] Field of Search .............. 526/340.2, 337; 525/236, 237, 232, 332.6, 333.1; 152/209 R

[56] References Cited

U.S. PATENT DOCUMENTS

| | | |
|---|---|---|
| 3,725,373 | 4/1973 | Yoo . |
| 4,521,587 | 6/1985 | Furukawa et al. ........... 526/340.2 X |
| 5,082,906 | 1/1992 | Hsu et al. ................. 526/340.2 X |
| 5,104,941 | 4/1992 | Wolpers et al. ................ 525/237 |

OTHER PUBLICATIONS

Natta, Porri, and Carbonaro, 77 Makromolecular Chemistry 126 (1964).

Sun and Wang, 2 Acta Polymerica Sinica 145 (1988).

*Primary Examiner*—Fred Teskin
*Attorney, Agent, or Firm*—Alvin T. Rockhill

[57] ABSTRACT

Strain crystallizable 3,4-polyisoprene having a 3,4-microstructure content which is within the range of about 65% to about 85%, a cis-1,4-microstructure content which is within the range of about 15% to about 35%, and essentially no trans-1,4-microstructure or 1,2-microstructure can be synthesized in organic solvents to quantitative yields after short polymerization times by utilizing the catalyst systems of this invention. This invention specifically discloses a process for the synthesis of 3,4-polyisoprene which comprises polymerizing isoprene monomer in an organic solvent at a temperatIre which is within the range of about −10° C. to about 100° C. in the presence of a catalyst system which is comprised of (a) an organoiron compound which is soluble in the organic solvent, wherein the iron in the organoiron compound is in the +3 oxidation state, (b) a partially hydrolyzed organoaluminum compound which was prepared by adding a protonic compound selected from the group consisting of water, alcohols and carboxylic acids to the organoaluminum compound, and (c) a chelating aromatic amine; wherein the molar ratio of the chelating amine to the organoiron compound is within the range of about 0.1:1 to about 1:1, wherein the molar ratio of the organoaluminum compound to the organoiron compound is within the range of about 5:1 to about 200:1, and wherein the molar ratio of the protonic compound to the organoaluminum compound is within the range of about 0,001:1 to about 0.2:1.

17 Claims, No Drawings

TIRE TREAD COMPOUND MADE WITH STRAIN CRYSTALLIZABLE 3,4-POLYISOPRENE

This is a continuation-in-part application of U.S. patent application Ser. No. 07/930,629, filed on Aug. 17, 1992 (now issued as U.S. Pat. No. 5,239,023), which was a continuation-in-part application of U.S. patent application Ser. No. 07/716,475, filed on Jun. 17, 1991 (now issued as U.S. Pat. No. 5,151,398) which was a Divisional of U.S. patent application Ser. No. 07/602,546, filed on Oct. 24, 1990 (now issued as U.S. Pat. No. 5,082,906).

BACKGROUND OF THE INVENTION

Strain crystallizable elastomers are very desirable as tire polymers for improved tire properties, such as improved tire traction characteristics, improved flex characteristics and improved tear resistance. Unfortunately, polyisoprene which is prepared utilizing conventional procedures is not strain crystallizable due to its amorphous structure. Such 3,4-polyisoprenes can be easily prepared using an organolithium catalyst in conjunction with a polar modifier. For instance, Natta, Porri, and Carbonaro, 77 Makromolecular Chemistry 126 (1964) discloses a catalyst for preparing atactic 3,4-polyisoprene.

A technique for preparing crystallizable 3,4-polyisoprene is disclosed by Sun and Wang, 2 Acta Polymerica Sinica 145 (1988). These Chinese researchers disclose that crystalline 3,4-polyisoprene containing about 70% 3,4-microstructure and about 30% cis-1,4-microstructure can be prepared using a catalyst system containing iron acetylacetonate, a trialkyl aluminum compound, and an amine modifier in benzene. However, the utilization of this catalyst system developed by the Chinese results in the formation of gel and poor yields.

U.S. Pat. No. 3,725,373 to Yoo discloses a catalyst system which contains (a) an iron source, (b) an electron donor ligand such as 2,2-dipyridyl or 1,10-phenanthroline, and (c) a reducing agent. Yoo indicates that the iron compound can be in the form of a hydrate or alcohol complex. The catalyst system disclosed by Yoo is reported to be useful in homopolymerizing acrylonitrile.

SUMMARY OF THE INVENTION

It has been unexpectedly found that the inclusion of a small amount of a protonic compound in a catalyst system containing an organoaluminum compound, an organoiron compound and a chelating heterocyclic and aromatic amine in an aliphatic hydrocarbon solvent greatly improves yield and reduces gelation occurring during polymerization. The inclusion of the protonic compound also allows for the polymerization to be conducted in aliphatic organic solvents to high conversions at fast rates. The 3,4-polyisoprene which is synthesized using the catalyst system of this invention has a 3,4-microstructure content which is typically within the range of about 65% to about 85%, a cis-1,4-microstructure content which is within the range of about 15% to about 35%, and contains essentially no trans-1,4-microstructure or 1,2-microstructure. For purposes of this patent, the term "essentially no trans-1,4-microstructure or 1,2-microstructure" means that the 3,4-polyisoprene contains a total of less than about 2% and preferably less than about 1% trans-1,4-microstructure and 1,2-microstructure, based upon the total number of repeat units in the polymer. The utilization of such catalyst systems typically results in yields of greater than about 90% with yields in excess of 95% being preferred. The 3,4-polyisoprene produced also has a low gel content of less than about 10%. It will normally have a gel content of less than 5% and will preferably be "gel free" having a gel content of less than 1%.

The 3,4-polyisoprene made by utilizing the catalyst system and techniques of this invention is strain crystallizable. It is strain crystallizable because it contains essentially no trans-1,4-units or 1,2-units. This 3,4-polyisoprene is stereospecific and is believed to be syndiotactic or isotactic. In any case, it offers important benefits when employed in tire tread rubber compositions. For instance, improved traction characteristics and improved cut growth resistance can be obtained. The crystalizable 3,4-polyisoprene made utilizing the techniques of this invention resembles natural rubber in some respects, but it has a higher glass transition temperature and accordingly offers better traction characteristics in tire tread compositions.

The present invention specifically discloses a catalyst system which can be utilized in the homopolymerization of isoprene monomer into 3,4-polyisoprene or in the copolymerization of isoprene and 1,3-butadiene into random isoprenebutadiene copolymers having high vinyl contents, said catalyst system being comprised of (a) an organoiron compound which is soluble in the organic solvent, wherein the iron in the organoiron compound is in the +3 oxidation state, (b) a partially hydrolyzed organoaluminum compound which was prepared by adding a protonic compound selected from the group consisting of water, alcohols and carboxylic acids to the organoaluminum compound, and (c) a chelating aromatic amine; wherein the molar ratio of the chelating amine to the organoiron compound is within the range of about 0.1:1 to about 1:1, wherein the molar ratio of the organoaluminum compound to the organoiron compound is within the range of about 5:1 to about 200:1, and wherein the molar ratio of the protonic compound to the organoaluminum compound is within the range of about 0,001:1 to about 0.2:1.

The subject invention also reveals a process for the synthesis of a polydiene rubber having a high vinyl content which comprises homopolymerizing isoprene monomer or copolymerizing isoprene and butadiene in an organic solvent at a temperature which is within the range of about −10° C. to about 100° C. in the presence of a catalyst system which is comprised of (a) an organoiron compound which is soluble in the organic solvent, wherein the iron in the organoiron compound is in the +3 oxidation state, (b) a partially hydrolyzed organoaluminum compound, which was prepared by adding a protonic compound selected from the group consisting of water, alcohols and carboxylic acids to the organoaluminum compound, and (c) a chelating aromatic amine; wherein the molar ratio of the chelating amine to the organoiron compound is within the range of about 0.1:1 to about 1:1, wherein the molar ratio of the organoaluminum compound to the organoiron compound is within the range of about 5:1 to about 200:1, and wherein the molar ratio of the protonic compound to the organoaluminum compound is within the range of about 0,001:1 to about 0.2:1.

The present invention further discloses a process for the synthesis of 3,4-polyisoprene which comprises: (1) adding a catalyst system which is comprised of (a) an organoiron compound which is soluble in the organic solvent, wherein the iron in the organoiron compound is in the +3 oxidation state, (b) a partially hydrolyzed organoaluminum compound, which was prepared by adding a protonic compound selected from the group consisting of water, alcohols and carboxylic acids to the organoaluminum compound, and (c) a chelating aromatic amine; wherein the molar ratio of the chelating amine to the organoiron compound is within the range of about 0.1:1 to about 1:1, wherein the molar ratio of the organoaluminum compound to the organoiron compound is within the range of about 5:1 to about 200:1, and wherein the molar ratio of the protonic compound to the organoaluminum compound is within the range of about 0.001:1 to about 0.2:1 to a polymerization medium containing isoprene monomer and an organic solvent, and (2) allowing the isoprene monomer to polymerize at a temperature which is within the range of about −10° C. to about 100° C.

DETAILED DESCRIPTION OF THE INVENTION

The catalyst systems of this invention are comprised of (a) an organoiron compound which is soluble in the organic solvent wherein the iron in the organoiron compound is in the +3 oxidation state, (b) a partially hydrolyzed organoaluminum compound which was prepared by adding a protonic compound selected from the group consisting of water, alcohols and carboxylic acids to the organoaluminum compound, and (c) a chelating aromatic amine. The organoiron compound will be soluble in the organic solvent used in the polymerization medium with the iron being in the +3 oxidation state. Some representative examples of suitable organoiron compounds include ferric benzoate, ferric acetate, ferric naphthenate, ferric octanoate, ferric neodecanoate, ferric palmirate, ferric stearate, ferric acetylacetonate, ferric diglyoxime, ferric tetracarbonyl, ferric 2-ethylhexanoate, ferrocene and alkylferroceneso The organoaluminum compounds that can be utilized will typically be of the structural formula:

in which $R_1$ is selected from the group consisting of alkyl groups (including cycloalkyl), aryl groups, alkaryl groups, arylalkyl groups, alkoxy groups, hydrogen and fluorine; $R_2$ and $R_3$ being selected from the group consisting of alkyl groups (including cycloalkyl), aryl groups, alkaryl groups, and arylalkyl groups. Some representative examples of organoaluminum compounds that can be utilized are diethyl aluminum hydride, di-n-propyl aluminum hydride, di-n-butyl aluminum hydride, diisobutyl aluminum hydride, diphenyl aluminum hydride, di-p-tolyl aluminum hydride, dibenzyl aluminum hydride, phenyl ethyl aluminum hydride, phenyl-n-propyl aluminum hydride, p-tolyl ethyl aluminum hydride, p-tolyl n-propyl aluminum hydride, p-tolyl isopropyl aluminum hydride, benzyl ethyl aluminum hydride, benzyl n-propyl aluminum hydride, and benzyl isopropyl aluminum hydride, diethylaluminum ethoxide, diisobutylaluminum ethoxide, dipropylaluminum methoxide, trimethyl aluminum, triethyl aluminum, tri-n-propyl aluminum, triisopropyl aluminum, tri-n-butyl aluminum, triisobutyl aluminum, tripentyl aluminum, trihexyl aluminum, tricyclohexyl aluminum, trioctyl aluminum, triphenyl aluminum, tri-p-tolyl aluminum, tribenzyl aluminum, ethyl diphenyl aluminum, ethyl di-p-tolyl aluminum, ethyl dibenzyl aluminum, diethyl phenyl aluminum, diethyl p-tolyl aluminum, diethyl benzyl aluminum and other triorganoaluminum compounds. Trialkylaluminum compounds are generally preferred. The preferred trialkylaluminum compounds include triethyl aluminum (TEAL), tri-n-propyl aluminum, triisobutyl aluminum (TIBA), trihexyl aluminum, diisobutyl aluminum hydride (DIBA-H), and diethyl aluminum fluoride.

A wide variety of chelating aromatic and heterocyclic amines can be utilized in the catalyst systems of this invention. The chelating aromatic amine will typically be a chelating aromatic diamine. Some representative examples of suitable chelating aromatic amines include 1,10-phenanthroline, 2,2'-bipyridine, 2,2', 2"-terpyridine, cyanopyridines, amino anilines, amino pyridines, nitroanilines, nitropyridines and 1,4-phenylenediamine.

The protonic compound will typically be water, an alcohol or a carboxylic acid. In most cases, it is preferred to utilize water as the protonic compound. However, methanol, ethanol, isopropyl alcohol, n-propyl alcohol, t-butanol, isobutyl alcohol, or n-butyl alcohol can also be employed. Higher alcohols can also be utilized as the protonic compound. A wide variety of carboxyl group containing compounds can also be utilized as the protonic compound. For instance, stearic acid can be used.

The ratio of the chelating aromatic amine to the organoiron compound in the catalyst system will typically be within the range of about 0.1:1 to about 1:1. The molar ratio of the chelating aromatic amine to the organoiron compound will preferably be within the range of about 0.2:1 to about 0.5:1. The molar ratio of the organoaluminum compound to the organoiron compound will typically be within the range of about 5:1 to about 200:1. It is normally preferred for the molar ratio of the organoaluminum compound to the organoiron compound to be within the range of about 20:1 to about 100:1. It is most preferred for the molar ratio of the organoaluminum compound to the organoiron compound to be within the range of about 40:1 to about 60:1. The molar ratio of the protonic compound to the organoaluminum compound will typically be within the range of about 0,001:1 to about 0.2:1. It is generally preferred for the ratio of the protonic compound to the organoaluminum compound to be within the range of 0,005:1 to about 0.1:1. It is most preferred for the molar ratio of the protonic compound to the organoaluminum compound to be within the range of about 0.01:1 to about 0.07:1.

The polymerizations of this invention will typically be carried out as solution polymerizations which are conducted in an organic solvent. The organic solvent can be an aromatic hydrocarbon or a saturated aliphatic hydrocarbon. Some representative examples of suitable aromatic solvents include benzene, toluene, xylenes, ethylbenzene, diethylbenzene, isobutylbenzene, and the like. For environmental reasons aliphatic solvents are highly preferred. Some representative examples of suitable aliphatic solvents include n-hexane, cyclohexane, methylcyclohexane, isohexanes, n-heptane, n-octane, isooctanes, n-decane, 2,2-dimethylbutane, petroleum ether, kerosene, petroleum spirits, petroleum naphtha and the like. It is important for the organic solvent to be a liquid under the conditions (temperature and pressure) utilized for the polymerization.

Such solution polymerizations are carried out in a polymerization medium which is comprised of the organic solvent and monomers (isoprene and optionally 1,3-butadiene). Such polymerization mediums will typically contain from about 5 weight percent to about 35 weight percent monomers, based upon the total weight of the polymerization medium. It is typically preferred for the polymerization medium to contain from about 10% to about 30% monomers. It is generally more preferred for the polymerization medium to contain from about 15 weight percent to about 25 weight percent monomers. As the polymerization proceeds, monomer will be converted to polymer. Accordingly, the polymerization medium will typically contain from about 5 weight percent to about 35 weight percent monomers and polymer, based upon the total weight of the polymerization medium.

The polymerizations of this invention can be carried out as a batch process, on a semi-continuous basis, or on a continuous basis. In any case, the polymerization is initiated by adding the catalyst system to the isoprene containing polymerization medium. The four component catalyst system can be added to the polymerization medium as a premix or it can be prepared in situ. It is typically preferred to prepare a premix of the protonic compound with the organoaluminum compound. It has been found that it is most desirable to add the isoprene monomer to the polymerization medium first and then to add the organoiron compound and the chelating aromatic amine with a preformed protonic compound/organoaluminum compound component being added last.

Such polymerizations are typically conducted at a temperature which is within the range of −10° C. to about 100° C. It is generally preferred for the polymerization to be carried out at a temperature which is within the range of about 0° C. to about 50° C. It is most preferred for such polymerizations to be conducted at a temperature which is within the range of 10° C. to 30° C.

By utilizing the catalyst systems of this invention, very high conversions can be reached after relatively short polymerization times. For instance, conversions of greater than 95% can be attained in one to two hours. Additionally, virtually no gelation occurs when the catalyst systems of this invention are employed. The crystallizable 3,4-polyisoprene made by the process of this invention will have a dilute solution viscosity of less than about 5.0 dl/g and preferably less than 3.0 dl/g. It is important for the 3,4-polyisoprene to have a dilute solution viscosity of less than 5.0 dl/g to be processable.

After the polymerization has been completed, the crystallizable 3,4-polyisoprene produced can be recovered utilizing standard techniques. In most cases, it will be desirable to utilize a coagulation technique in recovering the crystallizable 3,4-polyisoprene. It will generally be desirable to remove residual organic solvent from the polymer by evaporation which can be facilitated by the application of vacuum and elevated temperatures.

It is normally advantageous to utilize the strain crystallizable 3,4-polyisoprene rubber of this invention in blends with other rubbers in making tire tread compounds. Such treads made with this strain crystallizable 3,4-polyisoprene exhibit greatly improved traction characteristics and cut growth resistance without sacrificing rolling resistance or tread wear characteristics. Tire tread compounds of this type will normally contain from about 5% to about 40% of the 3,4-polyisoprene, from about 25% to about 75% of a styrene-butadiene rubber (SBR), and from about 10% to about 55% natural rubber (polyisoprene), based upon the total amount by weight of rubbers in the compound. Tire treads of this type will preferably contain from about 10% to about 30% of the 3,4-polyisoprene, from about 35% to about 65% SBR, and from about 20% to about 65% natural rubber. It is normally more preferred for the tread to contain from about 15% to about 25% of the 3,4-polyisoprene, from about 40% to about 60% SBR, and from about 25% to about 30% natural rubber. To improve treadwear characteristics, high cis-1,4-polybutadiene can be substituted for up to about 80% of the SBR in such blends.

The tire tread compounds made with the strain crystallizable 3,4-polyisoprene of this invention can be prepared by simply blending or mixing the 3,4-polyisoprene with the other rubbers. This blending can be accomplished utilizing compounding techniques well known to persons skilled in the art. For example, the 3,4-polyisoprene can be mixed with the other rubbers in a Banbury mixer or on a mill mixer. The technique used in the preparation of the tire tread compound is not important as long as there is a thorough mixing of all of the rubbers and rubber chemicals in the blend.

In most cases, the compounds utilized in making tire treads will be comprised of (a) the 3,4-polyisoprene, (b) SBR, (c) natural rubber, (d) optionally, high cis-1,4-polybutadiene, (e) sulfur and/or a sulfur containing compound, (f) at least one filler, (g) at least one accelerator, (h) at least one antidegradant, (i) at least one processing oil, (j) zinc oxide, (k) optionally a tackifier resin, (l) optionally a reinforcing resin, (m) optionally one or more fatty acids, (n) optionally a peptizer, and (o) optionally one or more scorch inhibiting agents. The fast curing rubber blend will normally contain from 0.5 to 5 phr (parts per 100 parts of rubber) of sulfur and/or a sulfur containing compound with 1 to 2.5 phr being preferred. It may be desirable to utilize insoluble sulfur in cases where bloom is a problem.

Normally from 10 to 150 phr of at least one filler will be utilized in the blend with 30 to 80 phr being preferred. In most cases, at least some carbon black will be utilized in the filler. The filler can, of course, be comprised totally of carbon black. Silica can be included in the filler to improve tear resistance and heat build up. Clays and/or talc can be included in the filler to reduce cost. The blend will also normally include from 0.1 to 2.5 phr of at least one accelerator with 0.2 to 1.5 phr being preferred. Antidegradants, such as antioxidants and antiozonants, will generally be included in the blend in amounts ranging from 0.25 to 10 phr with amounts in the range of 1 to 5 phr being preferred. Processing oils will generally be included in the blend in amounts ranging from 2 to 100 phr with amounts ranging from 5 to 50 phr being preferred. The blends of this invention will also normally contain from 0.5 to 10 phr of zinc oxide with 1 to 5 phr being preferred. These blends can optionally contain from 0 to 10 phr of a tackifier resin, 0 to 10 phr of reinforcing resins, 1 to 10 phr of fatty acids, 0 to 2.5 phr of peptizers, and 0 to 1 phr of scorch inhibiting agents.

The tread rubber compounds of this invention can be employed in making tire treads utilizing standard tire building procedures. Such tires can then be cured at conventional curing temperatures within the range of about 140° C. to about 250° C. The temperature used to cure tires made with such tread compounds will typically be within the range of about 160° C. to about 200° C. and will preferably be within the range of 180° C. to 210° C.

This invention is illustrated by the following examples which are merely for the purpose of illustration and are not to be regarded as limiting the scope of the invention or the manner in which it can be practiced. Unless specifically indicated otherwise, parts and percentages are given by weight.

COMPARATIVE EXAMPLE 1

Sixty-five grams of column dried isoprene premix (15% in hexane) was charged to a 4 oz. (118 ml.) bottle. Ferric acetylacetonate (0.015 mmoles) and 1,10-phenanthroline was added at a molar ratio of 2:1 followed by the addition of TIBA (0.30 mmoles). The molar ratio of the TIBA to the ferric acetylacetonate used in this experiment was 20/1. The polymerization was carried out at 10° C. for 48 hours. A shortstop solution consisting of methanol, rosin acid, triisopropanolamine, and an antioxidant was then added to quench the polymerization and also to stabilize the polymer formed. After evaporating hexane, the polymer was dried in a vacuum oven at 50° C. overnight. 3.5 grams of highly gelled polyisoprene was obtained (35% yield; 31% gel). It had a Tg of +6° C. and the microstructure (by NMR) 74% 3,4-PI and 26% cis-1,4-PI. Its unstretched crystallinity at room temperature was 7% as determined using WAXS (wide angle x-ray scattering) method.

EXAMPLE 2

The procedure described in Example 1 was utilized in this example except that a partially hydrolyzed TIBA (the molar ratio of water to TIBA was 0.064) was used instead of TIBA and the polymerization time was 30 minutes. The hydrolyzed TIBA was prepared by directly adding the calculated amount of water to TIBA at room temperature. 9.3 grams of polymer was obtained (93% yield). The polymer contained 0% gel and had a Tg at +6° C. and a melting point at 45° C. The dilute solution viscosity (DSV) of this polyisoprene in toluene was 4.71.

EXAMPLE 3

The procedure described in Example 2 was utilized in this example except that the molar ratio of TIBA to ferric acetylacetonate was increased to 50:1. The yield was 63% (6.3 grams) and it was determined to have a glass transition temperature at +5.4° C. and a melting point at 50° C. It had 22% crystallinity at room temperature without stretching. Upon stretching at room temperature, its crystallinity increased to 42%. It was also determined to have a microstructure which contained 78% 3,4-polyisoprene units, and 22% cis-1,4-polyisoprene units. The dilute solution viscosity of this polymer in toluene was 4.08.

EXAMPLE 4

The procedure described in Example 2 was utilized in this example except that the molar ratio of TIBA to ferric acetylacetonate was increased to 150:1. The yield was 47% (4.7 grams) and it was determined to have a glass transition temperature at +4.2° C. and a melting point at 120° C. It had 34% crystallinity at room temperature without stretching. It was also determined to have a microstructure which contained 76% 3,4-polyisoprene units, and 26% cis-1,4-polyisoprene units. The dilute solution viscosity of this polymer in toluene was 2.53.

EXAMPLE 5

The procedure described in Example 2 was utilized in this example except that the polymerization was maintained at 25° C. for one hour. The yield was 100% (10 grams) and it was determined to have a glass transition temperature at +2.4° C. It was also determined to have a microstructure which contained 72% 3,4-polyisoprene units, and 28% cis-1,4-polyisoprene units. The dilute solution viscosity of this polyisoprene in toluene was 2.78.

EXAMPLE 6

The procedure described in Example 2 was utilized in this example except that 0.5 phm of 1,2-butadiene was added to the isoprene premix and polymerization was 16 hours. The yield 97% (9.7 grams) and it was determined to have a glass transition temperature at +7.8° C. It was also determined to have a microstructure which contained 80% 3,4-polyisoprene units, and 20% cis-1,4-polyisoprene units. The dilute solution viscosity in toluene was 2.03.

EXAMPLE 7

In this experiment, the polymerization was conducted in a one gallon (3.8 liter) reactor using a higher catalyst level at 30° C. Thus, 2000 grams of monomer solution which contained 14.73% isoprene in hexane was charged into a one gallon reactor (3.8 liters). Polymerization was initiated by charging 20.6 ml of a 0.05M solution of ferric acetylacetonate and 1,10-phenanthroline and 71.1 ml of a 0.87M solution of hydrolyzed TIBA (the molar ratio of water to TIBA was 0.075). Small samples were taken out of the reactor to monitor the level of residual monomers. Such samples showed that the polymerization was 79.3%, 87%, and 91% complete after 30, 60 and 120 minutes, respectively. The polymerization was shortstopped after 4 hours of polymerization time and polymer was recovered using a similar procedure as described in Example 1. 287 grams of dried polymer was obtained (97.2% yield). The polyisoprene produced was determined to have a glass transition temperature at 0.65° C. The dilute solution viscosity in toluene was 2.30.

EXAMPLE 8

The procedure described in Example 7 was utilized in this example except that the polymerization was conducted continuously in two one-gallon (3.8 liter) reactors. The monomer solution was pumped into the first reactor at a rate of 6.6 kg/hour at 35° C. The residence time for both reactors were set at 30 minutes. The average conversions were 85 and 90% for first and second reactors, respectively, The average dilute solution viscosities in toluene were 2.4 to 2.7. The polyisoprene produced was determined to have a Tg at +2 to +3° C.

EXAMPLES 9–17

Fifty-seven grams of column dried monomer premix (18% in hexane) was charged to a 4 oz. (118 ml.) bottle. The composition of the monomer premix is shown in Table I. Ferric acetylacetonate (0.015 mmoles) and 1,10-phenanthroline was added at a molar ratio of 2:1 followed by the addition of hydrolyzed TIBA (0.30 mmoles). The molar ratio of water to TIBA utilized in making the hydrolyzed TIBA was 0.06:1. The molar ratio of the TIBA to the ferric acetylacetonate used in this experiment was 20:1. The polymerization was carried out at about 22° C. for 2 hours. A shortstop solution consisting of methanol, rosin acid, triisopropanolamine, and an antioxidant was then added to quench the polymerization and also to stabilize the polymer formed. After evaporating hexane, the polymer was dried in a vacuum oven at 50° C. overnight. The glass transition temperatures and microstructures of the polymers synthesized is shown in Table I.

TABLE I

| Ex. | Monomer Premix Isoprene/Butadiene | Glass Transition Temperature | 1,2-polybutadiene Repeat Units | 3,4-polyisoprene Repeat Units |
|---|---|---|---|---|
| 9  | 90/10 | − 8° C. | 6%  | 70% |
| 10 | 80/20 | −14° C. | 10% | 63% |
| 11 | 70/30 | −21° C. | 15% | 55% |
| 12 | 60/40 | −35° C. | 20% | 46% |
| 13 | 50/50 | −36° C. | 25% | 40% |
| 14 | 40/60 | −44° C. | 29% | 33% |
| 15 | 30/70 | −48° C. | 35% | 24% |
| 16 | 20/80 | −52° C. | 41% | 16% |
| 17 | 10/90 | −56° C. | 45% | 9%  |

As can be seen, the glass transition temperature of the polymer could be controlled by varying the ratio of isoprene to butadiene. The yield obtained in this series of experiments was greater than about 85%. These copolymers which contained from 5% to 95% isoprene and from 5% to 95% butadiene had high vinyl contents (sums of 1,2-polybutadiene repeat units and 3,4-polyisoprene units) which were within the range of 54% to 76%. In most cases the isoprene-butadiene rubber will contain from about 30% to about 70% isoprene and from about 30% to about 70% butadiene.

As a general rule, vinyl contents can be increased by increasing the ratio of the organoaluminum compound to the organoiron compound. However, higher ratios of the organoaluminum compound to the organoiron compound normally result in lower conversions.

EXAMPLE 18

The procedure utilized in Example 11 was repeated in this experiment except that the molar ratio of TIBA to ferric acetylacetonate was increased to 50:1. The polymer yield was reduced to about 60% with the total vinyl content being 78%. The isoprene-butadiene rubber made had a glass transition temperature of −13° C. with its microstructure being 22% 1,2-polybutadiene, 11% 1,4-polybutadiene, 56% 3,4-polyisoprene, and 11% 1,4-polyisoprene.

The 3,4-polyisoprene made utilizing the catalyst systems of this invention typically has a Tg which is within the range of 0.5° C. to 15° C. It more typically has a Tg which is within the range of 2° C. to 10° C. and preferably has a Tg which falls within the range of 4° C. to 8° C. These 3,4-polyisoprenes typically have number average molecular weights which fall within the range of 150.000 to 350.000 and have a ratio of weight average molecular weight to number average molecular weight of about 2:1 to 6:1 with this ratio of weight average molecular weight to number average molecular weight preferably being about 3:1. The 3,4-polyisoprene made by the process of this invention is very useful for making tire tread rubber compositions which provide good rolling resistance while offering outstanding wet and dry traction characteristics. Such tread compounds are typically prepared by blending from about 2 parts to about 25 parts of the 3,4-polyisoprene with from about 75 parts to about 98 parts of at least one other sulfur vulcanizable rubber. Such tire tread compounds more typically contain from about 5 to about 15 parts of the 3,4-polyisoprene. The sulfur vulcanizable rubber into which the 3,4-polyisoprene is blended will typically be natural rubber, synthetic cis-1,4-polyisoprene rubber, cis-1,4-polybutadiene rubber, styrenebutadiene rubber, styrene-butadiene-isoprene rubber, butadiene-isoprene rubber, and/or blends thereof.

EXAMPLE 19

In this experiment a strain crystallizable 3,4-polyisoprene was made using the iron catalyst system of this invention. The 3,4-polyisoprene rubber made had a Mooney viscosity of 64 and had a glass transition temperature at −2° C. A blend was made by mixing 20 parts of the 3,4-polyisoprene with 50 parts of SBR and 30 parts of natural rubber. The blend was sulfur cured and evaluated on an Autovibron at 11 Hz. It was also compared to a control which was made utilizing a 3,4-polyisoprene synthesized employing a standard lithium catalyst system.

It should be noted that 3,4-polyisoprene rubbers made with lithium catalyst systems are not strain crystallizable. Such amorphous 3,4-polyisoprenes typically contain from 50% to 60% 3,4-microstructure, from 20% to 24% trans-1,4-microstructure, from 20% to 24% cis-1,4-microstructure, and from 2% to 3% 1,2-microstructure.

Table II compares some of the physical properties of the cured blend made with the strain crystallizable 3,4-polyisoprene to those of the control.

TABLE II

| | Strain Crystallizable 3,4-polyisoprene | Amorphous 3,4-polyisoprene |
|---|---|---|
| Modulus | | |
| 100% | 1.9 MPa | 1.9 MPa |
| 200% | 4.3 MPa | 4.2 MPa |
| 300% | 7.7 MPa | 7.6 MPa |
| Tensile | 13.5 MPa | 13.3 MPa |
| Elongation at Break | 524% | 526% |
| Hardness (Shore A) | | |
| Room Temperature | 67 | 66 |
| 100° C. | 58 | 57 |
| Rebound | | |
| Room Temperature | 23% | 26% |
| 100° C. | 44% | 45% |
| Din Abrasion (Volume Loss) | 181 | 176 |
| PEEL ADHESION (95° C.) | 544 N-cm | 553 N-cm |
| Autovibron (11 Hz) | | |
| Tan Delta at 0° C. | 0.294 | 0.175 |
| Tan Delta at 60° C. | 0.142 | 0.140 |

The samples of cure rubber blends were tested by an Autovibron ® automated dynamic viscoelastic tester, an instrument provided by Imass, Inc., of which Model AVD985 is used herein, to determine, or measure, the relationship of tan delta versus temperature at 0° C. and 60° C. for the indicated rubber blend containing the 3,4-polyisoprene. A dynamic strain amplitude of 0.1% and a frequency of 11 Hertz were used.

As can be determined from Table II, the blend made with the strain crystallizable 3,4-polyisoprene had modulus, hardness, rebound, and adhesion characteristics which were very similar to that of the control. However, the blend made with the strain crystallizable 3,4- polyisoprene had a much higher tan delta value at 0° C. which translates to much better traction characteristics in tire treads. Nevertheless, it had a tan delta value at 60° C. which was very similar to that of the control which means that treadwear and rolling resistance are not compromised.

While certain representative embodiments and details have been shown for the purpose of illustrating the subject invention, it will be apparent to those skilled in this art that various changes and modifications can be made therein without departing from the scope of the subject invention.

What is claimed is:

1. A polyisoprene rubber comprised of isoprene repeat units, wherein the polyisoprene rubber is strain crystallizable, wherein the polyisoprene rubber has a low gel content of less than about 10%, wherein from about 65% to about 85% of the isoprene repeat units are of the 3,4-microstructure, wherein from about 15% to about 35% of the isoprene repeat units are of the cis-1,4-microstructure, and wherein essentially no isoprene repeat units are of the trans-1,4-microstructure or 1,2-microstructure.

2. A polyisoprene rubber as specified in claim 1 wherein the polyisoprene rubber has a gel content of less than about 5%.

3. A polyisoprene rubber as specified in claim 1 wherein the polyisoprene rubber has a gel content of less than about 1%.

4. A polyisoprene rubber as specified in claim 1 which contains less than about 1% isoprene repeat units which have a trans-1,4-microstructure or a 1,2-microstructure.

5. A polyisoprene rubber as specified in claim 3 which contains less than about 1% isoprene repeat units which have a trans-1,4-microstructure or a 1,2-microstructure.

6. A rubber blend which has an excellent combination of properties for use in making tire treads which is comprised of (a) the strain crystallizable 3,4-polyisoprene rubber specified in claim 1, (b) styrene-butadiene rubber, and (c) natural rubber.

7. A rubber blend as specified in claim 6, which is further comprised of high cis-1,4-polybutadiene.

8. A rubber blend as specified in claim 6, wherein the blend contains from about 5 weight percent to about 40 weight percent of the 3,4-polyisoprene, from about 25 weight percent to about 75 weight percent of the styrene-butadiene rubber, and from about 10 weight percent to about 55 weight percent of the natural rubber.

9. A rubber blend as specified in claim 6, wherein the blend contains from about 10 weight percent to about 30 weight percent of the 3,4-polyisoprene, from about 35 weight percent to about 65 weight percent of the styrene-butadiene rubber, and from about 20 weight percent to about 40 weight percent natural rubber.

10. A rubber blend as specified in claim 6, wherein the blend contains from about 15 weight percent to about 25 weight percent of the 3,4-polyisoprene, from about 40 weight percent to about 60 weight percent of the styrene-butadiene rubber, and from about 25 weight percent to about 35 weight percent natural rubber.

11. A rubber blend as specified in claim 6 which is further comprised of sulfur and/or a sulfur containing compound, at least one filler, at least one accelerator, at least one antidegradant, at least one processing oil, and zinc oxide.

12. A rubber blend as specified in claim 11 wherein the filler is carbon black.

13. A rubber blend as specified in claim 12 wherein the carbon black is present in an amount which is within the range of 10 phr to 150 phr.

14. A rubber blend as specified in claim 12 wherein the carbon black is present in an amount which is within the range of 30 phr to 80 phr.

15. A rubber blend as specified in claim 14 which is further comprised of a reinforcing resin, a fatty acid, a peptizer, and a scorch inhibiting agent.

16. A rubber blend as specified in claim 6 wherein said rubber blend has been cured.

17. A tire having tread which is comprised of the rubber blend specified in claim 16.

* * * * *